United States Patent
Togano et al.

(10) Patent No.: US 10,175,673 B2
(45) Date of Patent: Jan. 8, 2019

(54) PROGRAMMABLE CONTROLLER SYSTEM

(71) Applicant: Mitsubishi Electric Corporation, Tokyo (JP)

(72) Inventors: Kentaro Togano, Tokyo (JP); Masaya Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 172 days.

(21) Appl. No.: 15/124,955

(22) PCT Filed: Apr. 6, 2015

(86) PCT No.: PCT/JP2015/060762
§ 371 (c)(1),
(2) Date: Sep. 9, 2016

(87) PCT Pub. No.: WO2016/162926
PCT Pub. Date: Oct. 13, 2016

(65) Prior Publication Data
US 2017/0153619 A1   Jun. 1, 2017

(51) Int. Cl.
*G05B 19/18* (2006.01)
*G05B 19/05* (2006.01)

(52) U.S. Cl.
CPC .......... *G05B 19/054* (2013.01); *G05B 19/05* (2013.01); *G05B 19/056* (2013.01); *G05B 2219/13114* (2013.01); *G05B 2219/15118* (2013.01)

(58) Field of Classification Search
CPC .... G05B 19/054; G05B 19/056; G05B 19/05; G05B 2219/13114; G05B 2219/15118
See application file for complete search history.

(56) References Cited

U.S. PATENT DOCUMENTS 5,243,511 A    9/1993   Zifferer et al.
5,471,380 A    11/1995  Itami et al.
(Continued)

FOREIGN PATENT DOCUMENTS

JP    6-289912 A      10/1994
JP    11-305809 A     11/1999
(Continued)

OTHER PUBLICATIONS

Communication dated Sep. 5, 2017, from the Intellectual Property Office of Taiwan in counterpart application No. 105110721.
(Continued)

*Primary Examiner* — Adam Lee
(74) *Attorney, Agent, or Firm* — Sughrue Mion, PLLC; Richard C. Turner

(57) ABSTRACT

A programmable controller system includes a control device; a functional device including a buffer memory and a general-purpose logic unit; and a peripheral device that creates a user program. The peripheral device includes a circuit setting unit, which sets operation data indicating the operation of a logic of the general-purpose logic unit; and a circuit-control-parameter setting unit, which sets a circuit control parameter representing the relation between a buffer memory address indicating an address in the buffer memory and a logic address indicating an address in the logic. The functional device includes a circuit control unit that transfers the operation data to the logic address on the basis of the specified buffer memory address and the circuit control parameter.

15 Claims, 7 Drawing Sheets

(56) References Cited

U.S. PATENT DOCUMENTS

| | | | |
|---|---|---|---|
| 5,666,282 A | 9/1997 | Itami et al. | |
| 6,233,665 B1* | 5/2001 | Bolyn | G06F 12/0817 |
| | | | 711/118 |
| 6,466,827 B1 | 10/2002 | Stine | |
| 6,725,288 B2 | 4/2004 | Nagao et al. | |
| 7,937,172 B2 | 5/2011 | Nakayama | |
| 2004/0221106 A1* | 11/2004 | Perego | G06F 13/409 |
| | | | 711/115 |
| 2006/0164882 A1* | 7/2006 | Norman | G06F 13/1668 |
| | | | 365/158 |
| 2009/0070514 A1 | 3/2009 | Moriyama et al. | |
| 2009/0094389 A1* | 4/2009 | Keeler | G06F 3/0607 |
| | | | 710/33 |
| 2009/0192635 A1 | 7/2009 | Nakayama | |
| 2010/0142275 A1* | 6/2010 | Yogev | G06F 12/0238 |
| | | | 365/185.09 |
| 2013/0124802 A1* | 5/2013 | Glasco | G06F 12/0804 |
| | | | 711/128 |
| 2014/0089761 A1* | 3/2014 | Kwok | G06F 11/1048 |
| | | | 714/768 |

FOREIGN PATENT DOCUMENTS

| | | |
|---|---|---|
| JP | 2001-255911 A | 9/2001 |
| JP | 2001-282317 A | 10/2001 |
| JP | 2005-92676 A | 4/2005 |
| JP | 2007-334441 A | 12/2007 |
| JP | 2009-69864 A | 4/2009 |
| JP | 4345200 B2 | 7/2009 |
| JP | 2009-223591 A | 10/2009 |
| JP | 2010-271758 A | 12/2010 |
| JP | 2012-146131 A | 8/2012 |
| JP | 2012-194678 A | 10/2012 |
| JP | 2014-52672 A | 3/2014 |
| WO | 2006/011474 A1 | 2/2006 |
| WO | 2016/038645 A1 | 3/2016 |

OTHER PUBLICATIONS

Communication dated Apr. 25, 2017, from the Japanese Patent Office in counterpart application No. 2016-520107.
Communication dated Mar. 7, 2018, issued by the Korean Intellectual Property Office in corresponding Korean Application No. 10-2016-7024702.
Communication dated Nov. 23, 2017 from the European Patent Office in counterpart European application No. 15883655.1.
International Search Report for PCT/JP2015/060762 dated Jun. 30, 2015 [PCT/ISA/210].

* cited by examiner

FIG.3

CIRCUIT CONTROL PARAMETER

| No | BUFFER MEMORY ADDRESS | LOGIC ADDRESS | DATA CLASSIFICATION |
|---|---|---|---|
| 1 | 100 | 0 | DATA TYPE |
| 2 | 103 | 2 | DATA TYPE |
| 3 | 110 | 5 | DATA TYPE |
| ⋮ | ⋮ | ⋮ | ⋮ |
| N | n | m | DATA TYPE |

FIG.4

CIRCUIT-STATE ACQUISITION PARAMETER

| No | BUFFER MEMORY ADDRESS | LOGIC ADDRESS | DATA CLASSIFICATION |
|---|---|---|---|
| 1 | 200 | 1 | DATA TYPE |
| 2 | 205 | 4 | DATA TYPE |
| 3 | 208 | 8 | DATA TYPE |
| ⋮ | ⋮ | ⋮ | ⋮ |
| N' | n' | m' | DATA TYPE |

PROGRAMMABLE CONTROLLER SYSTEM

CROSS REFERENCE TO RELATED APPLICATIONS

This application is a National Stage of International Application No. PCT/JP2015/060762, filed on Apr. 6, 2015, the contents of all of which are incorporated herein by reference in their entirety.

FIELD

The present invention relates to a programmable controller system that includes a programmable controller and a peripheral device.

BACKGROUND

A user program executed by a programmable controller is created by a peripheral device such as a personal computer having a programming tool installed therein. The user program created by the peripheral device is transferred to the programmable controller via a communication cable. The programmable controller includes a functional device and a control device having a processor and performs a process in accordance with the user program to control an external device, which is the controlling target. Patent Literature 1 discloses a technique for creating a sequence program by using a program creation device for a programmable controller and transferring the sequence program to a programmable controller having a functional unit.

CITATION LIST

Patent Literature

Patent Literature 1: International Publication No. 2006/011474

SUMMARY

Technical Problem

The functional device of the programmable controller is versatile and can perform functions specified by the user. However, conventional programmable controllers have a problem in that functions of the functional device cannot be changed and functions cannot be added thereto. In view of this problem, in PCT/JP2014/004673, there has been proposed a technique related to an input/output control device, an input/output control method, and a program executed by a programmable controller that can be easy to use and can realize various functions. According to this technique, it is possible to obtain the input/output control desired by the user by arbitrarily changing a circuit selector in an input interface, a logic circuit, and an output interface. However, functions realized by the input interface, the logic circuit, and the output interface are different for different circuit settings set by the user. Therefore, the roles of the input interface, the logic circuit, and the output interface cannot be determined uniquely. Further, address maps in a buffer memory are arranged in accordance with certain rules, and thus when the user program accesses the input interface, the logic circuit, and the output interface to acquire a status and to change the settings, it is necessary to access the buffer memory mapped independently of the user's intended circuit setting. Therefore, in a case where continuous access using iteration is attempted within the user program, address calculations become complicated.

The present invention has been achieved in view of the above problems, and an object of the present invention is to provide a programmable controller system that can easily set or change the functions of a functional device of a programmable controller in order for the programmable controller to realize various functions.

Solution to Problem

In order to solve the above problems and achieve the object, an aspect of the present invention is a programmable controller system including: a programmable controller that includes a control device and a functional device that is connected to the control device via a bus and that includes a buffer memory and a general-purpose logic unit; and a peripheral device that is connected to the programmable controller via a communication cable and creates a user program, wherein the peripheral device includes a circuit setting unit that sets operation data indicating an operation of a logic of the general-purpose logic unit, and a circuit-control-parameter setting unit that sets a circuit control parameter that represents a relation between a buffer memory address indicating an address in the buffer memory and a logic address indicating an address in the logic, and the functional device includes a circuit control unit that transfers the operation data to the logic address on a basis of the specified buffer memory address and the circuit control parameter.

Advantageous Effects of Invention

The present invention can easily change the functions of a functional device of a programmable controller.

BRIEF DESCRIPTION OF DRAWINGS

FIG. 3 is a diagram illustrating a circuit control parameter according to the first embodiment.

FIG. 4 is a diagram illustrating a circuit-state acquisition parameter according to the first embodiment.

DESCRIPTION OF EMBODIMENTS

A programmable controller system according to embodiments of the present invention will be explained below in detail with reference to the accompanying drawings. The present invention is not limited to the embodiments.

First Embodiment

Figure 1:
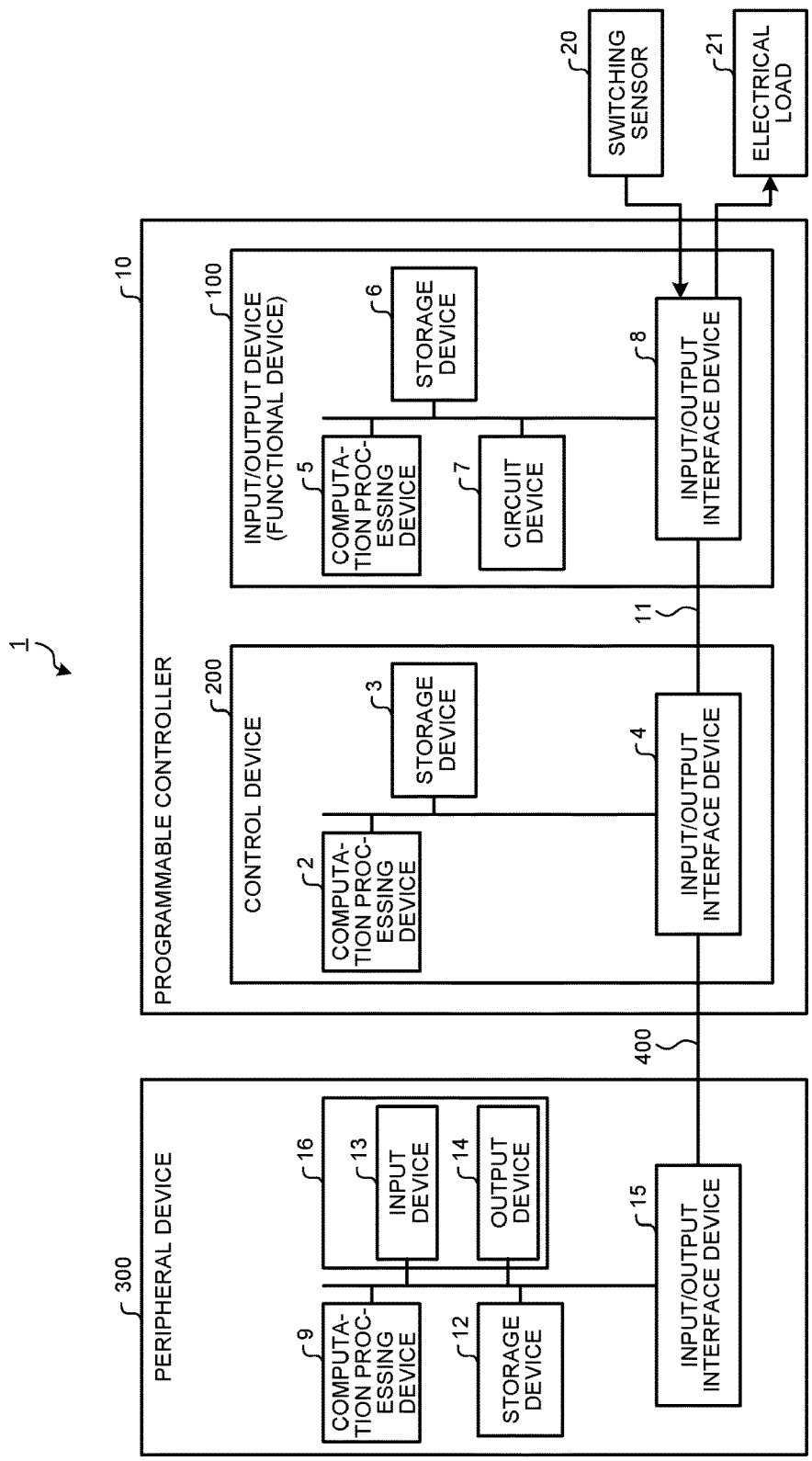
FIG. 1 is a configuration diagram illustrating a programmable controller system according to a first embodiment.

FIG. 1 is a configuration diagram illustrating an example of a programmable controller system 1. As illustrated in FIG. 1, the programmable controller system 1 includes a programmable controller 10 and a peripheral device 300 that is connected to the programmable controller 10 via a communication cable 400. The peripheral device 300 is a programming tool or a personal computer that creates a user program.

The user program is a program for controlling an electrical load 21, which is the controlling target of the programmable controller system 1. The electrical load 21 is an external device such as an actuator or a display device. The user program is, for example, a ladder program or a C-language program.

The programmable controller 10 includes a control device 200 and a functional device 100 that is connected to the control device 200 via a bus 11. The functional device 100 is an input/output device 100 that performs input and output of data.

The user program created by the peripheral device 300 is transferred to the programmable controller 10 via the communication cable 400. The programmable controller 10 can perform a computation process in accordance with the user program to control the electrical load 21. Further, the programmable controller 10 can control the electrical load 21 merely with the logic included in a circuit device 7 of the input/output device 100 without using the user program.

The control device 200 includes a computation processing device 2 including a microprocessor such as a CPU (Central Processing Unit); a storage device 3 including a memory such as a ROM (Read Only Memory) or a RAM (Random Access Memory); and an input/output interface device 4. The user program transferred from the peripheral device 300 is stored in the storage device 3. The computation processing device 2 performs a computation process in accordance with the user program stored in the storage device 3.

The input/output device 100 includes a computation processing device 5 including a microprocessor; a storage device 6 including a memory such as a ROM or a RAM; the circuit device 7 including a general-purpose logic integrated circuit including a plurality of logic circuits; and an input/output interface device 8. The input/output device 100 receives input data from a switching sensor 20. The switching sensor 20 includes at least one of an operation switch provided in an operation panel and a sensor switch for checking an operation of an external device. The control device 200 can perform a computation process on the basis of input data supplied from the switching sensor 20 to generate a control signal. Further, the programmable controller 10 can generate a control signal using only the logic included in the circuit device 7 of the input/output device 100 without using the control device 200. The input/output device 100 outputs a generated control signal to the electrical load 21.

The peripheral device 300 includes a computation processing device 9 including a microprocessor such as a CPU; a storage device 12 including an internal memory such as a ROM or a RAM and an external memory such as a hard disk device; an input/output interface device 15; and a graphical user interface (GUI) 16. The graphical user interface 16 includes an input device 13 including at least one of a keyboard, a mouse, and a touch panel; and an output device 14 including a display device such as a flat panel display. The input device 13 is operated by the user.

Figure 2:
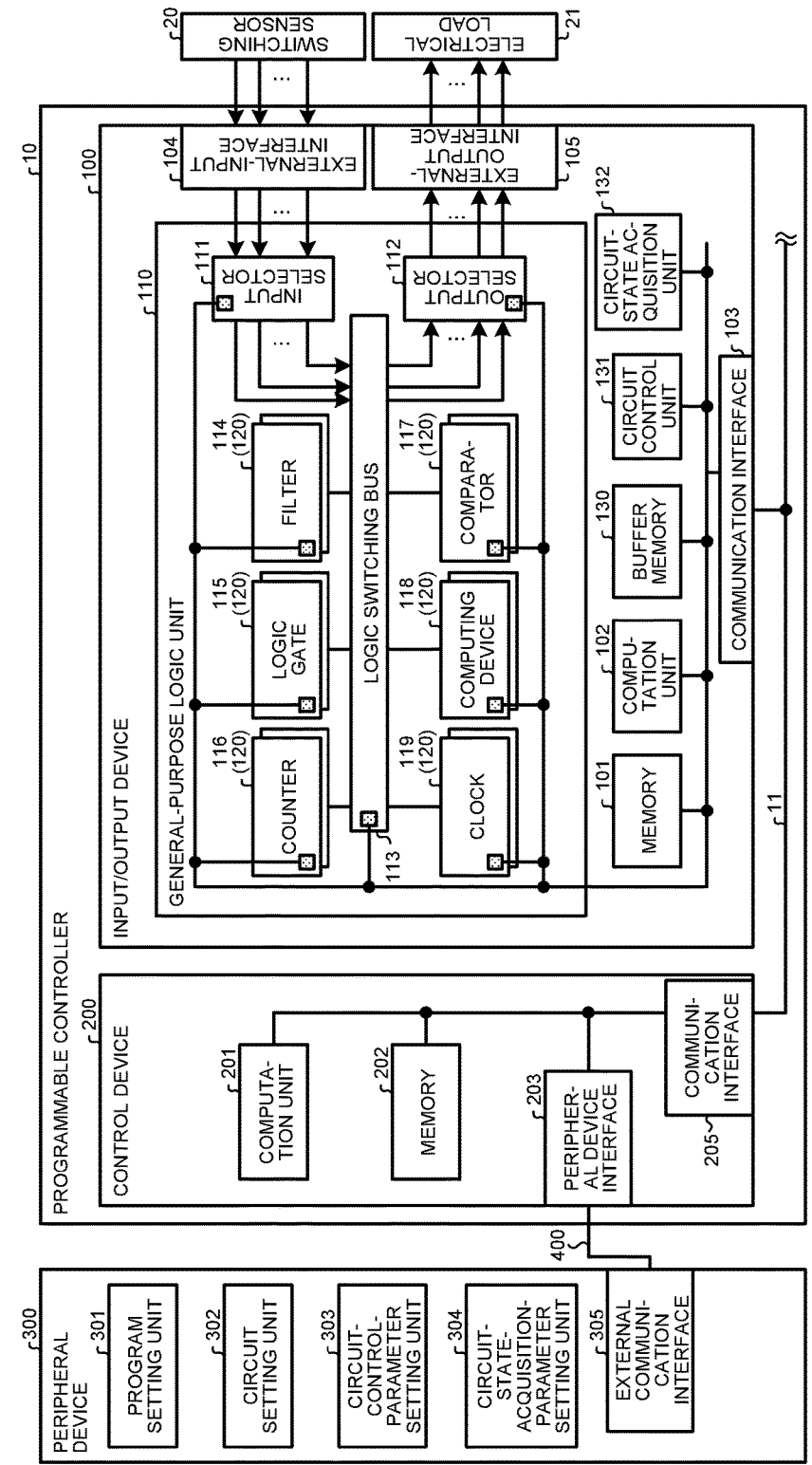
FIG. 2 is a block diagram illustrating the programmable controller system according to the first embodiment.

FIG. 2 is a block diagram illustrating the programmable controller system 1. As illustrated in FIG. 2, the control device 200 includes a computation unit 201 that performs a computation process; a memory 202 that stores a user program therein; a peripheral device interface 203 that is connected to the peripheral device 300 via the communication cable 400; and a communication interface 205 that is connected to the input/output device 100 via the bus 11.

The computation processing device 2 includes the computation unit 201. The storage device 3 includes the memory 202. The input/output interface device 4 includes the peripheral device interface 203 and the communication interface 205.

The memory 202 stores therein a user program; execution data used in the execution of the user program; and result data indicating the result of the execution of the user program. The computation unit 201 performs execution of the user program; reading of the execution data from the memory 202; and writing of the result data to the memory 202 at a predetermined control period.

The input/output device 100 includes a general-purpose logic unit 110 that includes a plurality of logics 120 operable in accordance with the operation mode specified by the user; a memory 101 that stores therein a circuit control parameter used for transfer of operation data indicating the operation that the logic 120 is to perform to the logic 120 and a circuit-state acquisition parameter used for acquisition of state data on the logic 120; a computation unit 102 that executes a computation process; a buffer memory 130 that temporarily stores therein operation data and state data; a circuit control unit 131 that acquires operation data from a specified buffer memory address in the buffer memory 130 and transfers the acquired operation data to a logic address in the logic 120 on the basis of the circuit control parameter stored in the memory 101; and a circuit-state acquisition unit 132 that acquires state data from a specified logic address in the logic 120 and transfers the acquired state data to a buffer memory address in the buffer memory 130 on the basis of the circuit-state acquisition parameter stored in the memory 101.

Further, the input/output device 100 includes a communication interface 103 that is connected to the control device 200 via the bus 11; an external-input interface 104 that is connected to the switching sensor 20; and an external-output interface 105 that is connected to the electrical load 21.

The computation processing device 5 includes the computation unit 102, the circuit control unit 131, and the circuit-state acquisition unit 132. The storage device 6 includes the memory 101 and the buffer memory 130. The circuit device 7 includes the general-purpose logic unit 110. The input/output interface device 8 includes the communication interface 103, the external-input interface 104, and the external-output interface 105.

The general-purpose logic unit 110 includes an input selector 111, an output selector 112, a logic switching bus 113, a filter 114, a logic gate 115, a counter 116, a comparator 117, a computing device 118, and a clock 119.

The input selector 111 and the output selector 112 are connected to the logic switching bus 113. Input data from the external-input interface 104 is sent to the logic switching bus 113 via the input selector 111. The filter 114, the logic gate 115, the counter 116, the comparator 117, the computing device 118, and the clock 119 are connected to the logic switching bus 113. At least one of the filter 114, the logic gate 115, the counter 116, the comparator 117, the computing device 118, and the clock 119 performs a process on the basis of the input data, and outputs a signal indicating the result of the process to the logic switching bus 113. The signal output to the logic switching bus 113 is sent to the external-output interface 105 via the output selector 112. The signal output to the logic switching bus 113 can be input again to the logic gate 115, the counter 116, the comparator 117, and the computing device 118.

The logic 120 is a general term for the filter 114, the logic gate 115, the counter 116, the comparator 117, the computing device 118, and the clock 119 from which the general-purpose logic unit 110 is configured. The general-purpose logic unit 110 includes a plurality of logics 120. The logic 120 is operated in accordance with original operation data specified by the user.

The peripheral device 300 includes a program setting unit 301 that sets a user program; a circuit setting unit 302 that sets, on the basis of the operation mode of the logic 120 specified by the user, operation data indicating the operation of the logic 120 of the general-purpose logic unit 110; a circuit-control-parameter setting unit 303 that sets a circuit control parameter representing the relation between the buffer memory address indicating an address in the buffer memory 130 and the logic address indicating an address in the logic 120; and a circuit-state-acquisition-parameter setting unit 304 that sets a circuit-state acquisition parameter representing the relation between the buffer memory address and the logic address.

The peripheral device 300 also includes an external communication interface 305 that is connected to the programmable controller 10 via the communication cable 400.

The computation processing device 9 includes the program setting unit 301, the circuit setting unit 302, the circuit-control-parameter setting unit 303, and the circuit-state-acquisition-parameter setting unit 304. The input/output interface device 15 includes the external communication interface 305.

The created user program is input to the program setting unit 301. The program setting unit 301 generates operation data indicating the operation of the programmable controller 10 on basis of the created user program. Further, the program setting unit 301 monitors state data that indicates the state of the programmable controller 10 and is supplied from the programmable controller 10.

The user program is sent from the program setting unit 301 to the memory 202 via the external communication interface 305 and the peripheral device interface 203. The memory 202 stores the user program therein. The computation unit 201 performs a computation process in accordance with the user program stored in the memory 202.

The circuit setting unit 302 sets an operation of the general-purpose logic unit 110 on the basis of specification made by the user and generates operation data indicating the set operation of the general-purpose logic unit 110. The specification of the operation mode is made by the user via the graphical user interface 16, which includes the input device 13 and the output device 14. Setting of the operation of the general-purpose logic unit 110 includes setting of operations of a plurality of logics 120 of the general-purpose logic unit 110 and setting of the wiring of the input selector 111, the output selector 112, and the logic switching bus 113. The operation data of the general-purpose logic unit 110 includes operation data indicating the operation of the logic 120 and wiring data indicating the wiring setting. The circuit setting unit 302 may have a function of simulating the operation of the logic 120.

Furthermore, the circuit setting unit 302 specifies a specific buffer memory address from among a plurality of buffer memory addresses in the buffer memory 130 on the basis of the specification made by the user, and generates buffer-memory-address data indicating the specified buffer memory address.

The operation data indicating the operation of the general-purpose logic unit 110 is sent from the circuit setting unit 302 to the memory 101 of the input/output device 100 via the external communication interface 305, the peripheral device interface 203, the communication interface 205, and the communication interface 103. Further, the buffer-memory-address data is sent to the memory 101.

The circuit-control-parameter setting unit 303 sets the circuit control parameter representing the relation between the buffer memory address indicating an address in the buffer memory 130 and the logic address indicating an address in the logic 120. The circuit-control-parameter setting unit 303 associates the buffer memory address and the logic memory address with each other.

The circuit-state-acquisition-parameter setting unit 304 sets the circuit-state acquisition parameter representing the relation between the buffer memory address indicating an address in the buffer memory 130 and the logic address indicating an address in the logic 120. The circuit-state-acquisition-parameter setting unit 304 associates the buffer memory address and the logic address with each other.

The circuit control unit 131 transfers operation data to a logic address and sets or changes the operation of the logic 120 on the basis of the buffer memory address specified by the user, the operation data of the logic 120 stored in the memory 101, and the circuit control parameter stored in the memory 101.

The circuit control unit 131 also sets or changes the wiring of the input selector 111, the output selector 112, and the logic switching bus 113 on the basis of the operation data of the general-purpose logic unit 110 stored in the memory 101.

When operation data is changed that indicates the operation of the logic 120 specified from among the logics 120, the buffer memory 130 temporarily stores the operation data to be changed in a specified buffer memory address. The buffer memory address in the buffer memory 130 functions as an area for storing the operation data to be changed of the logic 120.

The buffer memory address is specified by the user via the graphical user interface 16 of the peripheral device 300. The buffer-memory address data indicating the buffer memory address specified via the graphical user interface 16 is sent from the circuit-control-parameter setting unit 303 to the memory 101 of the input/output device 100 via the external communication interface 305, the peripheral device interface 203, the communication interface 205, and the communication interface 103.

The circuit control unit 131 stores operation data to be changed in a buffer memory address that is specified from among the buffer memory addresses in the buffer memory 130 on the basis of the buffer-memory address data stored in the memory 101. The circuit control unit 131 transfers the operation data stored in the specified buffer memory address to a logic address on the basis of the circuit control parameter stored in the memory 101. The buffer memory address and the logic address are associated with each other on the basis of the circuit control parameter. Specifying a specific memory address from among a plurality of buffer memory addresses means specifying a specific logic address from among a plurality of logic addresses. The circuit control unit 131 transfers operation data to the logic address associated with the specified buffer memory address on the basis of the specified buffer memory address and the circuit control parameter. The transfer of the operation data to the specified logic address causes the operation of the logic 120 having the logic address to which the operation data has been transferred to be set or changed.

The circuit control unit 131 performs a process of setting the operation of the logic 120 at regular intervals. Due to this process, the operation of the logic 120 is set or changed by using a specified buffer memory address. The control device 200 can set or change the operation of the logic 120 without the peripheral device 300 as long as the buffer memory address, operation data, and circuit control parameter have been sent once from the peripheral device 300 to the memory 101. The setting or changing of the operation of the logic 120 can be performed with an external signal as a trigger.

The circuit-state acquisition unit 132 stores, on the basis of the buffer memory address specified by the user and a circuit-state acquisition parameter stored in the memory 101, state data indicating the state of a specified logic 120 in the logic address, and transfers the state data stored in the logic address to the buffer memory address.

Acquisition of state data indicating the current state of a certain logic 120 from among a plurality of logics 120 is requested by the user via the graphical user interface 16 of the peripheral device 300. By the user specifying a buffer memory address via the graphical user interface 16, the logic 120 for which acquisition of the state data is desired is specified. The buffer-memory address data indicating the specified buffer memory address is sent from the circuit-state-acquisition-parameter setting unit 304 to the memory 101 of the input/output device 100 via the external communication interface 305, the peripheral device interface 203, the communication interface 205, and the communication interface 103.

The circuit-state acquisition unit 132 stores the state data indicating the state of the specified logic 120 in the logic address included in the specified logic 120 on the basis of the buffer-memory address data stored in the memory 101 and the circuit-state acquisition parameter. The circuit-state acquisition unit 132 can store the state data of the specified logic 120 in the logic address on the basis of the specified buffer memory address and the circuit-state acquisition parameter stored in the memory 101. The buffer memory address and the logic address are associated with each other on the basis of the circuit-state acquisition parameter. Specifying a specific buffer memory address from among a plurality of buffer memory addresses means specifying a specific logic address from among a plurality of logic addresses. The circuit-state acquisition unit 132 can store the state data of the logic 120 in the logic address associated with the specified buffer memory address on the basis of the specified buffer memory address and the circuit-state acquisition parameter.

The circuit-state acquisition unit 132 transfers the state stored in the logic address to the buffer memory address associated with the logic address on the basis of the circuit-state acquisition parameter. The buffer memory address in the buffer memory 130 functions as an area for storing the state data indicating the state of the logic 120 for which acquisition of the state data is requested.

The circuit-state acquisition unit 132 performs a process of acquiring the state of the logic 120 at regular intervals. Due to this process, acquisition of the state data of the logic 120 is performed by using the specified buffer memory address. The control device 200 can acquire the state of the logic 120 without the peripheral device 300 as long as the buffer memory address and the circuit-state acquisition parameter have been sent once from the peripheral device 300 to the memory 101. Acquisition of the state data of the logic 120 can be performed with an external signal as a trigger.

The control device 200 can access the memory 101 and the buffer memory 130. The control device 200 accesses the memory 101 and the buffer memory 130 to cause the operation data of the logic 120, the state data of the logic 120, the circuit control parameter, and the circuit-state acquisition parameter to be transferred and stored in the memory 202. On the basis of at least one of the operation data and the state data, the control device 200 can perform a computation process in accordance with the user program in order to control the electrical load 21. Further, on the basis of at least one of the circuit control parameter and the circuit-state acquisition parameter, the control device 200 can perform a computation process in accordance with the user program in order to control the electrical load 21.

Examples of the operation data that the control device 200 can acquire are permission command data indicating a count permission command for the counter 116 and reset command data indicating a command for resetting a count value. An example of the state data that the control device 200 can acquire is count value data indicating the count value of the counter 116.

The state data of the logic 120 acquired by the circuit-state acquisition unit 132 is transferred to the program setting unit 301 of the peripheral device 300. The program setting unit 301 can monitor the state data of the logic 120. The graphical user interface 16 can output the state data that has been transferred to the peripheral device 300 to the output device 14.

FIG. 3 is a conceptual diagram illustrating a circuit control parameter stored in the memory 101. FIG. 4 is a conceptual diagram illustrating a circuit-state acquisition parameter stored in the memory 101.

As illustrated in FIG. 3, the circuit control parameter is a parameter representing the relation between the buffer memory address indicating an address in the buffer memory 130 and the logic address indicating an address in the logic 120. Data classification indicates a data type. The circuit control unit 131 accesses a specified buffer memory address to store a data value indicating operation data in the buffer memory address, and transfers the data value indicating the operation data to a logic address that is associated with the buffer memory address on the basis of the circuit control parameter.

As illustrated in FIG. 4, the circuit-state acquisition parameter is a parameter representing the relation between the buffer memory address indicating an address in the buffer memory 130 and the logic address indicating an address in the logic 120. Data classification indicates a data type. The circuit-state acquisition unit 132 accesses a logic address associated with a specified buffer memory address, stores a data value indicating state data of the logic 120 having the accessed logic address, and transfers the data value indicating the state data to the buffer memory address that is associated with the logic address on the basis of the circuit-state acquisition parameter. Because the circuit-state acquisition unit 132 sets the data value in the buffer memory 130, the control device 200 and the peripheral device 300 can acquire the state data of the logic 120 merely by accessing the buffer memory 130.

As illustrated in FIGS. 3 and 4, the buffer memory address used in the circuit control parameter and the buffer memory address used in the circuit-state acquisition parameter are different from each other. The logic address used in the circuit control parameter and the logic address used in the circuit-state acquisition parameter are different from each other.

Figure 5:
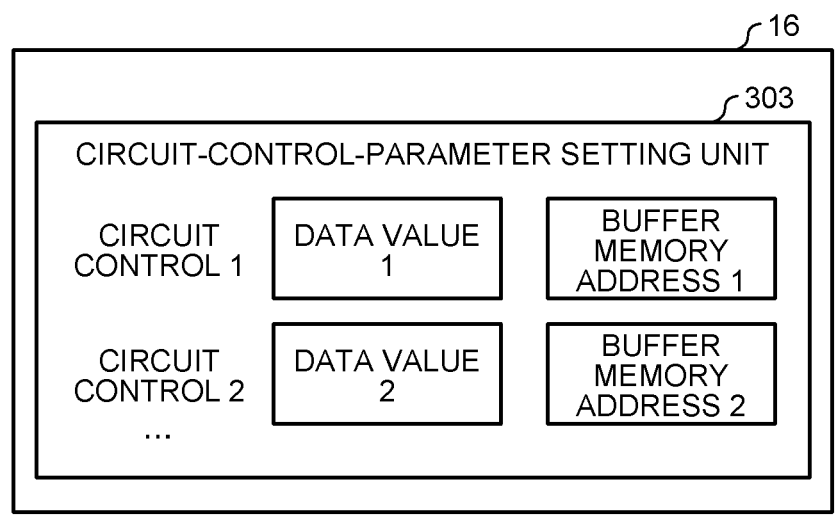
FIG. 5 is a diagram illustrating an operation of a graphical user interface according to the first embodiment.
Figure 6:
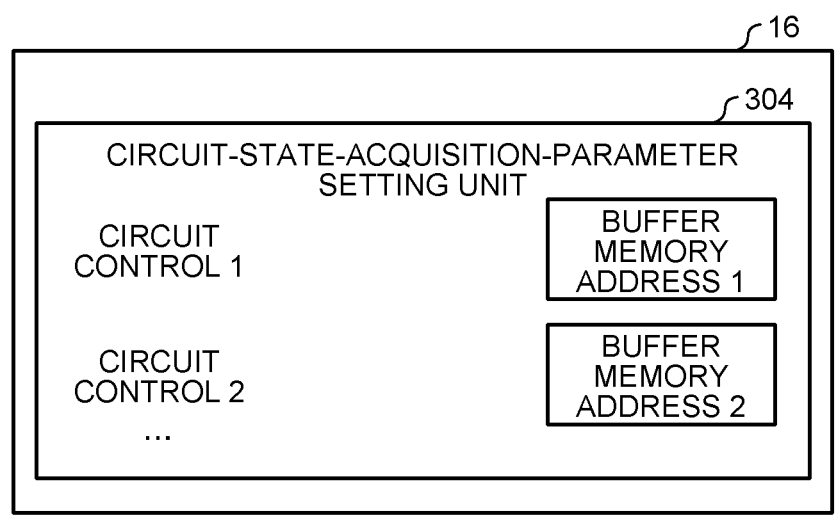
FIG. 6 is a diagram illustrating an operation of the graphical user interface according to the first embodiment.

FIG. 5 is a diagram illustrating the graphical user interface 16 that has output the circuit-control-parameter setting unit 303. FIG. 6 is a diagram illustrating the graphical user interface 16 that has output the circuit-state-acquisition-parameter setting unit 304.

As illustrated in FIG. 5, in the graphical user interface 16 indicating the circuit-control-parameter setting unit 303, the user specifies a data value that is a set value of operation data indicating an operation or a function after a desired change is made and a buffer memory address associated with a logic address in the logic 120 for which the change of the operation is desired.

As illustrated in FIG. 6, in the graphical user interface 16 indicating the circuit-state-acquisition-parameter setting unit 304, the user specifies a buffer memory address associated with a logic address in the logic 120 for which acquisition of state data is desired.

As illustrated in FIGS. 5 and 6, the logic address is not displayed in the graphical user interface 16. By the user specifying an arbitrary buffer memory address, the circuit-control-parameter setting unit 303 automatically associates the specified buffer memory address and the logic address on the basis of the circuit control parameter set in advance. The circuit-state-acquisition-parameter setting unit 304 automatically associates the specified buffer memory address and the logic address on the basis of the circuit-state acquisition parameter set in advance.

The buffer memory addresses can be input by the user one by one, all the buffer memory addresses from the top address specified by the user can be automatically serially input, or buffer memory addresses from the top address specified by the user can be serially input automatically only for logics with a high relevance.

Figure 7:
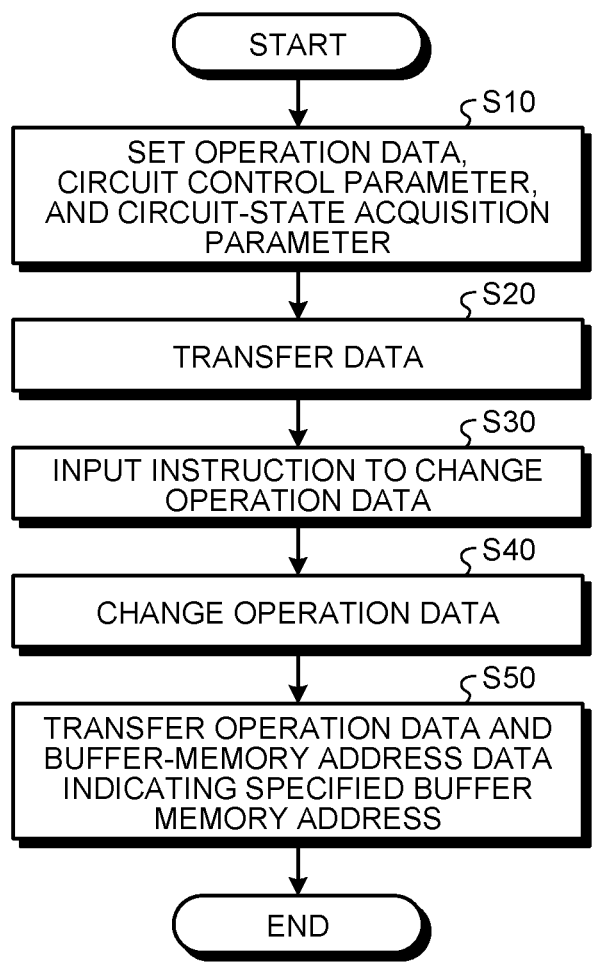
FIG. 7 is a flowchart illustrating an operation of the programmable controller system according to the first embodiment.

FIG. 7 is a flowchart illustrating an operation of the peripheral device 300 when operation data has been changed by the user.

Setting of a user program is performed by the program setting unit 301. Setting of operation data of the general-purpose logic unit 110, setting of a circuit control parameter, and setting of a circuit-state acquisition parameter are performed by the circuit setting unit 302, the circuit-control-parameter setting unit 303, and the circuit-state-acquisition-parameter setting unit 304, respectively (Step S10).

The operation data set in the circuit setting unit 302, the circuit control parameter set in the circuit-control-parameter setting unit 303, and the circuit-state acquisition parameter set in the circuit-state-acquisition-parameter setting unit 304 are transferred to the memory 101 (Step S20). The general-purpose logic unit 110 is operated on the basis of the set operation data.

When change of the operation data of the logic 120 is desired, the user operates the graphical user interface 16. As described with reference to FIG. 5, the user specifies and inputs a data value indicating the operation data for which change is desired and a buffer memory address associated with the logic 120 for which change of the operation data is desired.

In a case where an instruction to change the operation data of the logic 120 is input to the graphical user interface 16, the circuit setting unit 302 acknowledges that there is an input of the instruction to change the operation data (Step S30). The circuit setting unit 302 changes the operation data (Step S40). The circuit setting unit 302 transfers the changed operation data and buffer-memory address data indicating the specified buffer memory address to the memory 101 (Step S50).

Figure 8:
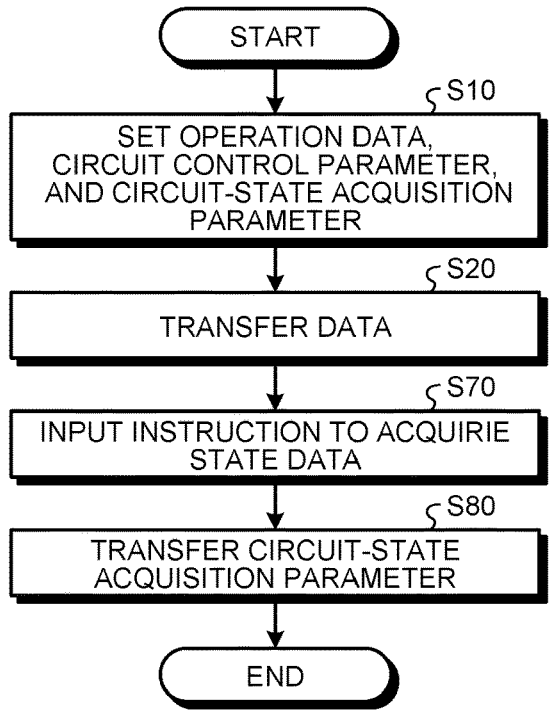
FIG. 8 is a flowchart illustrating an operation of the programmable controller system according to the first embodiment.

FIG. 8 is a flowchart illustrating an operation of the peripheral device 300 when acquisition of state data is desired by the user.

As described with reference to FIG. 7, setting of operation data of the general-purpose logic unit 110, setting a circuit control parameter, and setting of a circuit-state acquisition parameter are performed in the peripheral device 300 (Step S10), and the operation data, the circuit control parameter, and the circuit-state acquisition parameter having been set are transferred to the memory 101 (Step S20).

When acquisition of state data of the logic 120 is desired, the user operates the graphical user interface 16. As described with reference to FIG. 6, the user specifies and inputs a buffer memory address associated with the logic 120 for which acquisition of the state data is desired.

In a case where an instruction to acquire the state data of the logic 120 is input to the graphical user interface 16, the circuit setting unit 302 acknowledges that there is an input of the instruction to acquire the state data (Step S70). The circuit setting unit 302 transfers the circuit-state acquisition parameter to the memory 101 (Step S80).

Figure 9:
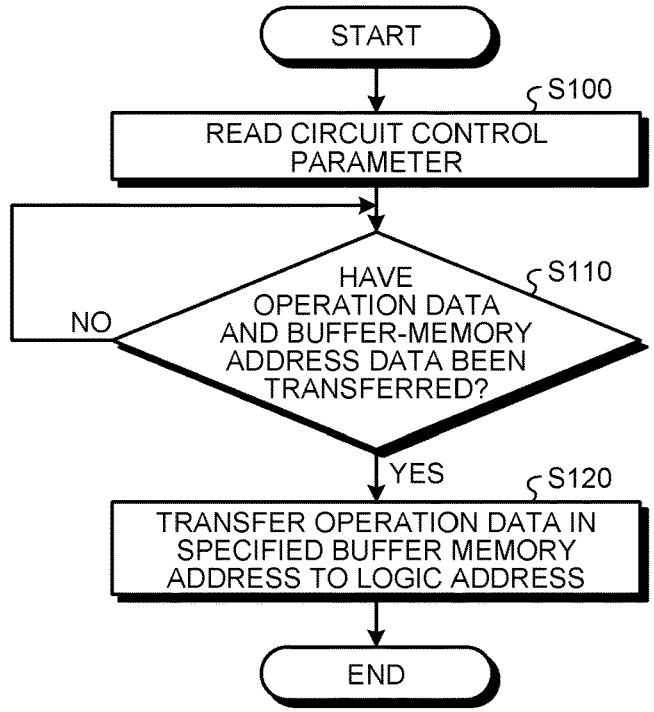
FIG. 9 is a flowchart illustrating an operation of the programmable controller system according to the first embodiment.

FIG. 9 is a flowchart illustrating an operation of the circuit control unit 131 of the input/output device 100.

The circuit control unit 131 reads a circuit control parameter from the memory 101 (Step S100).

The circuit control unit 131 determines whether operation data and buffer-memory address data have been transferred from the peripheral device 300 to the memory 101 (Step S110).

When it is determined at Step S110 that the operation data and the buffer-memory address data have not been transferred (NO at Step S110), the operation based on the operation data is continued in the general-purpose logic unit 110.

When it is determined at Step S110 that the operation data and the buffer-memory address data have been transferred (YES at Step S110), the circuit control unit 131 transfers the operation data in the specified buffer memory address to a logic address on the basis of the circuit control parameter (Step S120).

The operation data is transferred from the peripheral device 300 to the memory 101 in a state where it is associated with the buffer memory address specified by the user. The circuit control unit 131 can transfer the operation data in the specified buffer memory address to the logic address on the basis of the circuit control parameter.

The operation data transferred to the logic address is expanded in the logic 120. The logic 120 is operated on the basis of the changed operation data.

Figure 10:
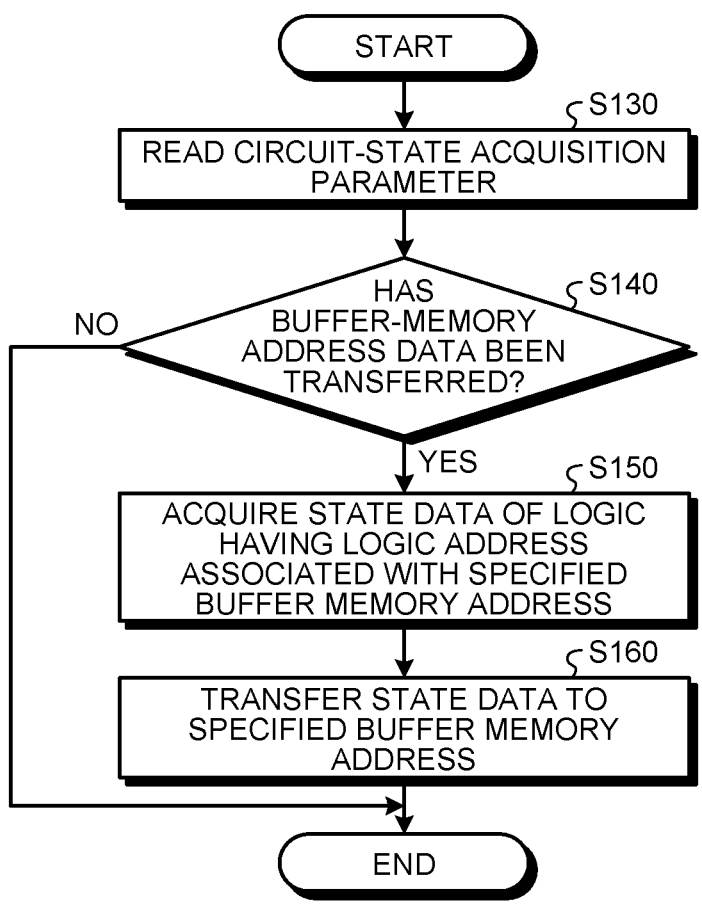
FIG. 10 is a flowchart illustrating an operation of the programmable controller system according to the first embodiment.

FIG. 10 is a flowchart illustrating an operation of the circuit-state acquisition unit 132 of the input/output device 100.

The circuit-state acquisition unit 132 reads a circuit-state acquisition parameter from the memory 101 (Step S130).

The circuit-state acquisition unit 132 determines whether buffer-memory address data indicating a specified buffer memory address has been transferred from the peripheral device 300 to the memory 101 (Step S140).

When it is determined at Step S140 that the buffer-memory address data has not been transferred (NO at Step S140), a process of one control period is ended.

When it is determined at Step S140 that the buffer-memory address data has been transferred (YES at Step S140), the circuit-state acquisition unit 132 acquires state data of the logic 120 having a logic address associated with the specified buffer memory address on the basis of the circuit-state acquisition parameter (Step S150). The state data of the logic 120 is stored in the logic address.

The circuit-state acquisition unit 132 transfers the state data to the specified buffer memory address (Step S160). The state data transferred to the buffer memory address is in a state where it can be accessed from the peripheral device 300 and the control device 200. The peripheral device 300 and the control device 200 can access the buffer memory 130 at an arbitrary timing to acquire the state data. The user can ascertain the state data via the graphical user interface 16.

As described above, according to the first embodiment, by using the circuit setting unit 302 that sets operation data indicating an operation of the logic 120, it is possible to set or change the logic 120 of the general-purpose logic unit 110 so as to have various functions desired by the user.

The circuit-control-parameter setting unit 303 sets a circuit control parameter representing the relation between a buffer memory address and a logic address, and the circuit control unit 131 transfers the operation data set by the circuit setting unit 302 from the buffer memory address to the logic address on the basis of the buffer memory address specified by the user and the circuit control parameter. The operation data is set in the buffer memory address in the buffer memory 130 specified by the user using the circuit-control-parameter setting unit 303, and is transferred to the logic address, so that control of the logic 120 of the general-purpose logic unit 110 is changed. Therefore, the user can easily change an operation or function of the general-purpose logic unit 110 merely by knowing the buffer memory address and without knowing the logic address in each logic 120 of the general-purpose logic unit 110.

In a case where buffer memory addresses in the buffer memory 130 are mapped independently of the user's intended operation setting of the logic 120, calculation of a logic address is complicated. Because the buffer memory address and logic address are associated with each other, it is possible to easily change the operation or function of the logic 120 having the logic address associated with the specified buffer memory address merely by specifying the buffer memory address.

The buffer memory addresses in the buffer memory 130 are available to the control device 200 and the peripheral device 300, and the user can have the programmable controller system 1 that has an address arrangement unique to the user by specifying the buffer memory address.

Furthermore, the circuit-state-acquisition-parameter setting unit 304 sets a circuit-state acquisition parameter representing the relation between a buffer memory address and a logic address. The circuit-state acquisition unit 132 acquires, on the basis of a buffer memory address specified by the user and the circuit-state acquisition parameter, state data indicating the state of the logic 120 having a logic address associated with the buffer memory address and transfers the state data from the logic address to the buffer address. The state data of the logic 120 is stored in the logic address associated with the buffer memory address specified by the user and is transferred from the logic address to the buffer memory address. Therefore, the user can easily acquire the state of the general-purpose logic unit 110 merely by knowing the buffer memory address and without knowing a logic address in each logic 120 of the general-purpose logic unit 110.

Specification of the buffer memory address is performed via the graphical user interface 16. The user can smoothly perform specification of the buffer memory address by using the graphical user interface 16. Although specification of the buffer memory address is performed by using the graphical user interface 16, specification and display of a logic address are not performed by using the graphical user interface 16. Therefore, the user can easily change operations or functions of the general-purpose logic unit 110 and easily acquire the state of the general-purpose logic unit 110 without knowing the logic address.

The configuration described in the above embodiment is only an example of the content of the present invention, and the configuration can be combined with other publicly known techniques, and a part of the configuration can be omitted or modified without departing from the scope of the present invention.

REFERENCE SIGNS LIST

1 programmable controller system, 2 computation processing device, 3 storage device, 4 input/output interface device, 5 computation processing device, 6 storage device, 7 circuit device, 8 input/output interface device, 9 computation processing device, 10 programmable controller, 11 bus, 12 storage device, 13 input device, 14 output device, 15 input/output interface device, 16 graphical user interface, 20 switching sensor, electrical load, 100 input/output device (functional device), 101 memory, 102 computation unit, 103 communication interface, 104 external-input interface, 105 external-output interface, 110 general-purpose logic unit, 111 input selector, 112 output selector, 113 logic switching bus, 114 filter, 115 logic gate, 116 counter, 117 comparator, 118 computing device, 119 clock, 120 logic, 130 buffer memory, 131 circuit control unit, 132 circuit-state acquisition unit, 200 control device, 201 computation unit, 202 memory, 203 peripheral device interface, 205 communication interface, 300 peripheral device, 301 program setting unit, 302 circuit setting unit, 400 communication cable.

The invention claimed is:
1. A programmable controller system comprising:
    a programmable controller comprising:
        a control device; and
        a functional device that is connected to the control device via a bus, wherein the functional device comprises a buffer memory and a general-purpose logic unit;
    a peripheral device that is connected to the programmable controller via a communication cable and that creates a user program, wherein the user program is transferred to the programmable controller via the communication cable, and wherein the peripheral device comprises:
        a circuit setting unit that sets operation data indicating at least one operation of the general-purpose logic unit, and
        a circuit-control-parameter setting unit that sets a circuit control parameter that represents a relationship between a buffer memory address indicating an address in the buffer memory and a logic address indicating an address in the general-purpose logic unit, wherein the functional device comprises a circuit control unit that transfers the operation data to the logic address based on the buffer memory address and the circuit control parameter, and wherein the control device performs a computation process based on the circuit control parameter in accordance with the user program; and
    an actuator, wherein the actuator is controlled based on the computation process.

2. The programmable controller system according to claim 1, wherein
the peripheral device includes a circuit-state-acquisition-parameter setting unit that sets a circuit-state acquisition parameter that represents a relationship between the buffer memory address and the logic address and that is used for acquisition of state data of the general-purpose logic unit, and
the functional device includes a circuit-state acquisition unit that, on a basis of the buffer memory address and the circuit-state acquisition parameter, acquires state data indicating a state of the general-purpose logic unit having the logic address and transfers the state data to the buffer memory address.

3. The programmable controller system according to claim 2, further comprising a graphical user interface (GUI) that includes a display device and an input device, wherein the GUI outputs the circuit-state-acquisition-parameter setting unit.

4. The programmable controller system according to claim 3, wherein the GUI outputs the buffer memory address of the circuit-state acquisition parameter.

5. The programmable controller system according to claim 4, wherein a buffer memory address associated with a logic address in a logic for which acquisition of the state data is desired is specified via the input device of the GUI, and the display device of the GUI outputs the specified buffer memory address.

6. The programmable controller system according to claim 1, further comprising a graphical user interface (GUI) that includes a display device and an input device, wherein
the buffer memory address is specified via the GUI, and
the circuit control parameter represents a mapping between the buffer memory address indicating the address from among a plurality of addresses in the buffer memory and the logic address indicating the address in the general-purpose logic unit from among a plurality of addresses for a plurality of operations of the general-purpose logic unit.

7. The programmable controller system according to claim 1, further comprising a graphical user interface (GUI) that includes a display device and an input device, wherein the GUI outputs the circuit-control-parameter setting unit.

8. The programmable controller system according to claim 7, wherein the GUI outputs a data value of the operation data and the buffer memory address of the circuit control parameter.

9. The programmable controller system according to claim 8, wherein
a data value of the operation data indicating a desired changed operation or function and a buffer memory address associated with a logic address of a logic for which the desired changed operation are specified via the input device of the GUI, and
the display device of the GUI outputs the data value of the operation data and the buffer memory address that are specified.

10. A programmable controller comprising:
a control device: and
a functional device that is connected to the control device via a bus and that comprises a buffer memory and a general-purpose logic unit, wherein the functional device further comprises:
an address memory that stores a circuit control parameter that represents a relationship between a buffer memory address indicating an address in the buffer memory and a logic address indicating an address the general-purpose logic unit, and
a circuit control unit that transfers the operation data to the logic address based on the buffer memory address and the circuit control parameter stored in the address memory, wherein the control device performs a computation process based on the circuit control parameter in accordance with a user program received by the control device, and wherein an actuator is controlled based on the computation process.

11. The programmable controller according to claim 10, wherein
the address memory stores therein a circuit-state acquisition parameter that represents a relationship between the buffer memory address and the logic address and that is used for acquisition of state data indicating a state of the logic address, and
the functional device includes a circuit-state acquisition unit that, on a basis of the buffer memory address and the circuit-state acquisition parameter stored in the address memory, acquires the state data and transfers the state data to the buffer memory address.

12. A programmable controller comprising:
a control device that comprises a peripheral device interface connected to a peripheral device comprising a graphical user interface (GUI) having a display device and an input device; and
a functional device that is connected to the control device via a bus and that comprises a buffer memory and a general-purpose logic unit, wherein:
the GUI outputs a parameter setting field, wherein the parameter setting field receives a circuit control parameter that represents a relationship between a buffer memory address indicating an address in the buffer memory and a logic address indicating an address in the general-purpose logic unit, and
the control device comprises an address memory, wherein a data value of operation data indicating a desired changed operation or a function and the buffer memory address associated with a logic address for which the desired changed operation are transferred into the address memory, wherein the data value and the buffer memory address are specified via the GUI, wherein the control device performs a computation process base on the circuit control parameter in accordance with a user program received by the control device, and wherein an actuator is controlled based on the computation process.

13. The programmable controller according to claim 12, wherein the GUI outputs a circuit-state-acquisition-parameter setting unit that sets a circuit-state acquisition parameter that represents a relationship between a buffer memory address and a logic address and that is used for acquisition of state data of the general-purpose logic unit, the state data being specified in the GUI, and
the buffer memory address associated with the logic address in a logic for which acquisition of the state data is desired is transferred to the address memory of the control device.

14. A display device for a programmable controller comprising:
a control device; and
a functional device that is connected to the control device via a bus and that comprises a buffer memory and a general-purpose logic unit, wherein the display device displays a circuit-control-parameter setting field which receives a circuit control parameter that represents a relationship between a buffer memory address indicating an address in the buffer memory and a logic address indicating an address of the general-purpose logic unit, wherein data indicating an operation of the general-purpose logic unit is transferred from the display device to the general-purpose logic unit based on the circuit control parameter, wherein the control device performs a computation process based on the circuit control parameter in accordance with a user program received by the control device, and wherein an actuator is controlled based on the computation process.

15. A display device for a programmable controller comprising:

a control device; and a functional device that is connected to the control device via a bus and that comprises a buffer memory and a general-purpose logic unit, wherein the display device displays a circuit-state-acquisition-parameter setting field which receives a circuit-state acquisition parameter that represents a relationship between a buffer memory address indicating an address in the buffer memory and a logic address indicating an address in the general-purpose logic unit, wherein the display device acquires state data of the general-purpose logic unit based on the circuit-state acquisition parameter, wherein the control device performs a computation process based on the circuit-state acquisition parameter in accordance with a user program received by the control device, and wherein an actuator is controlled based on the computation process.

* * * * *